April 22, 1924.
R. A. SMITH
SPIRAL SPRING COUPLING DEVICE
Filed April 24, 1920   2 Sheets-Sheet 1
1,491,761
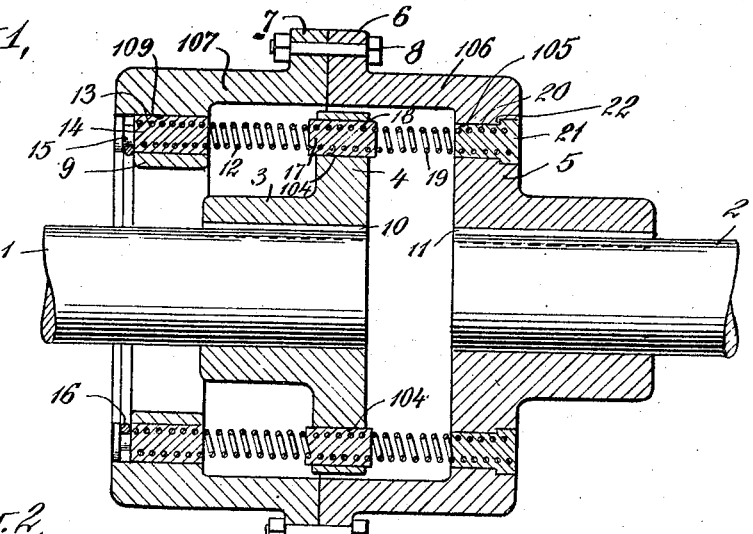
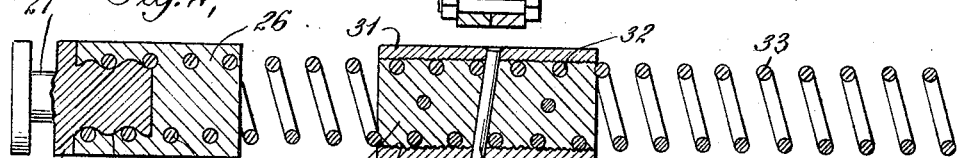
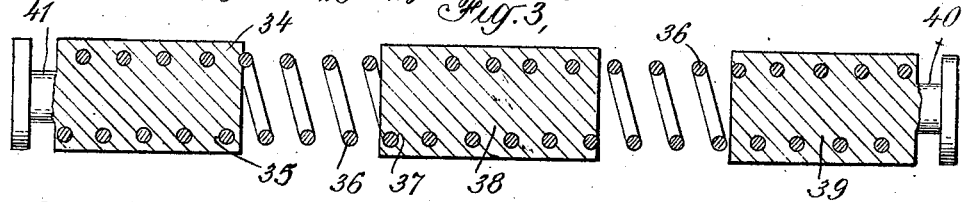
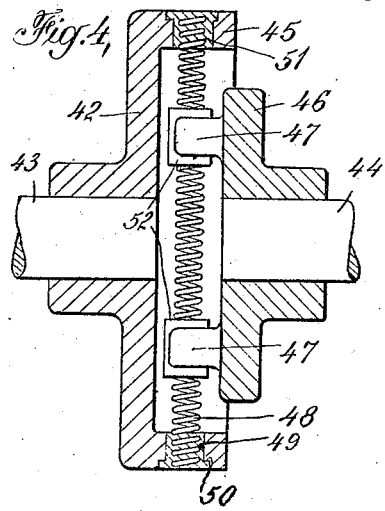
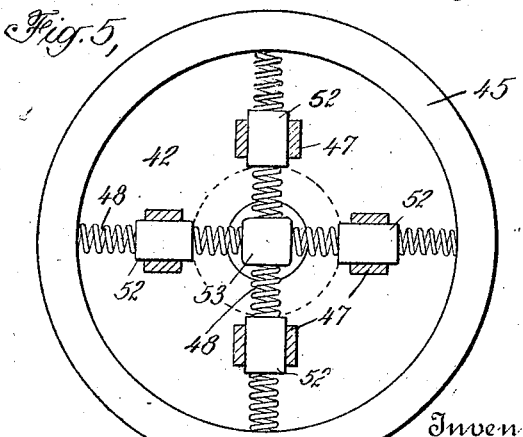
Inventor
Robert A. Smith
By his Attorney
Harry L. Duncan April 22, 1924.
R. A. SMITH
1,491,761
SPIRAL SPRING COUPLING DEVICE
Filed April 24, 1920   2 Sheets—Sheet 2
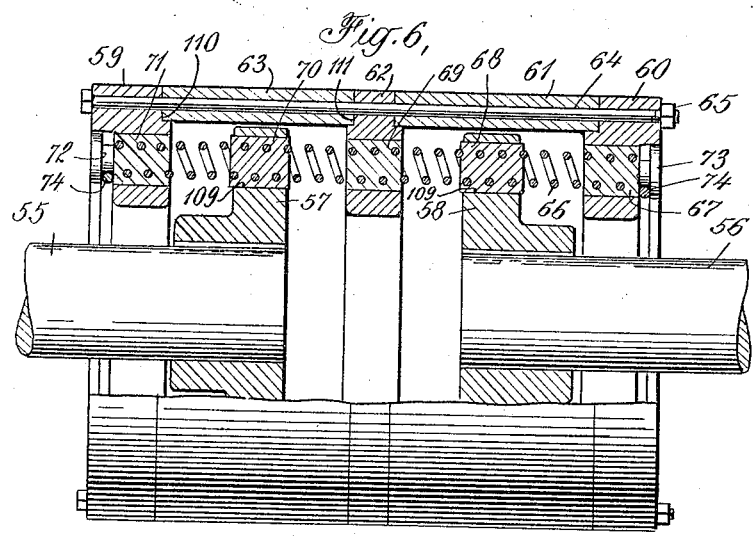
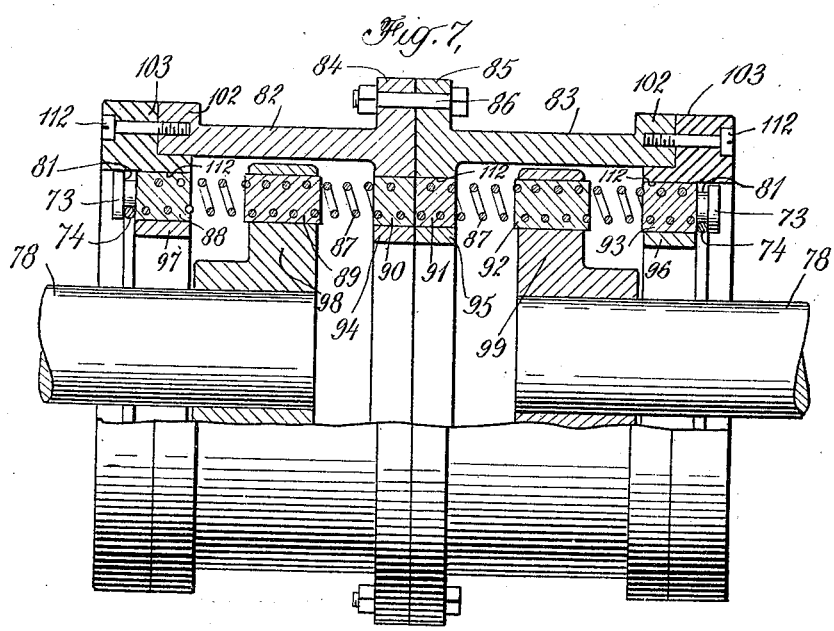
Inventor
Robert A. Smith
By his Attorney
Harry L. Duncan Patented Apr. 22, 1924.

1,491,761

UNITED STATES PATENT OFFICE.

ROBERT A. SMITH, OF MAHWAH, NEW JERSEY, ASSIGNOR TO SMITH AND SERRELL, OF MAHWAH, NEW JERSEY, A COPARTNERSHIP.

SPIRAL-SPRING-COUPLING DEVICE.

Application filed April 24, 1920. Serial No. 376,261.

*To all whom it may concern:*

Be it known that I, ROBERT A. SMITH, a citizen of the United States, and resident of Mahwah, Bergen County, State of New Jersey, have made a certain new and useful Invention Relating to Spiral-Spring-Coupling Devices, of which the following is a specification, taken in connection with the accompanying drawing, which forms part of the same.

This invention relates especially to flexible couplings in which the cooperating coupling members may be connected by one or more sets or series of spiral spring connecting members or elements which may have their ends or other separated portions permanently or removably secured or supported in one of the coupling members or other elements of the device while the intermediate portions of these spiral spring elements are transversely engaged by contact members on another coupling member or element. It is also desirable to have a sliding connection between the contact members and the intermediate or contact portions of the spiral spring elements for which purpose it is usually advantageous to form an enlarged contact portion on the desired intermediate portions of the spiral spring connecting members, so that movement longitudinally of the spring element can take place in this way. The spiral spring elements which may be made up of spring steel stock or strip of any suitable size and cross-section may be arranged in various ways in the coupling members or elements and various radial and annular arrangements are shown for illustrative purposes. While for some purposes the spiral spring connecting elements may be mounted or supported directly in one of the coupling members so as to cooperate with contact members or holes in the other coupling member, yet where increased flexibility is desired it is in many cases preferable to mount one or more series of such spiral spring connecting elements in a suitable casing which may constitute a floating element or ring yieldably engaged by each of the two coupling members through such spiral spring connecting elements.

In the accompanying drawings showing in a somewhat diagrammatic way illustrative embodiments of this invention, Fig. 1 is a longitudinal sectional view through an illustrative coupling.

Figs. 2 and 3 are enlarged longitudinal sections showing other forms of spiral spring connecting elements which may be used in this connection.

Fig. 4 is a longitudinal section showing a coupling in which the spiral spring elements may be substantially radially arranged.

Fig. 5 is a transverse section thereof; and

Figs. 6 and 7 show in longitudinal section several illustrative forms of couplings of this type in which floating rings or elements are employed for greater flexibility.

As shown in a somewhat diagrammatic way in Fig. 1 the coupling members 3, 5 may, if desired, be connected to the shafts 1, 2 in any suitable way as through the keys 10, 11. The coupling member 5 may be formed in one or more sections so as to support the desired series of spiral spring connecting elements adjacent their ends so that if desired these spring elements form an annular series substantially parallel to the axis of the coupling member in which one or both ends may be removably mounted, if desired, and preferably somewhat stretched or extended in most cases. As indicated the coupling member 5 may be formed with an integral sleeve 106 having a junction flange 6 thereon so that through the bolts 8 a cooperating junction flange 7 may be secured thereto so as to support therefrom the somewhat similar sleeve 107 which may be formed with an inwardly extending supporting flange 9. Cooperating or aligned holes, such as 105, 109, may be formed in these flanges so as to facilitate the permanent or releasable connection of the spring elements thereto and as indicated these spiral spring elements such as 12 may each have one end 20 permanently secured in holes 105 in the flange 5 as by casting or forcing into the holes and around the spring elements a suitable filling 21 of fusible or other material, such as type metal, Babbitt metal, or the like. By forming these holes 105 with an enlarged portion 22 the secure union of the spring elements to the flange is ensured. Of course in some cases similar permanent union may be effected between each end of the spring connecting elements and one of the coupling members. As indicated in Fig. 1, however, the opposite ends 13 of these spring elements may be removably supported in the holes 109 at the opposite end of this coupling member as by forming an integral cast metal end 14 upon and around the spring end and securing this within the hole 109 in any suitable way as by the locking ring 16 which may cooperate with a suitable locking recess 15 formed in these cast on or other ends secured to the spring elements which are preferably of such length as to be at least slightly extended when locked in the coupling member as described. Where the coupling member is formed with one or more separable sleeve sections, as indicated in Fig. 1, it is desirable to have at least one end of the spring elements removable in this way, so that the coupling may be taken apart for inspection or repairs which is sometimes desirable.

The cooperating coupling member may have the flange 4 formed with contact members adapted to transversely engage the intermediate yielding portions of these spring elements so that the resilient bending action of the spiral spring elements may be utilized for the resilient driving torque and also to a greater or less extent for the movements of the parts of the coupling device which are necessary to take up misalignment of the coupling members. Although it is not always necessary it is for this reason usually desirable to have a sliding connection between the intermediate contact portion of the spiral spring connecting elements and the contact member of the cooperating coupling member, and for this reason intermediate enlarged contact portions, such as 17, may be formed on the proper parts of the spiral spring connecting elements as by casting a filling of Babbitt metal, type metal, etc., to form these contact portions 17 around this part 18 of the spiral spring. Any suitable contact members may be formed on the coupling member 4 to engage or cooperate with these contact portions 17 of the connecting elements and if desired the flange 4 of this coupling member may be formed with a series of annular or other holes 104 properly spaced and shaped to accommodate the contact portions 17 formed on the springs. In this way the driving torque between the coupling members causes a transverse shearing displacement and incidental bending of the intermediate portions of the spring elements so that their free portions 12, 19 bend or yield laterally which allows ample resilient yielding or cushioning action with minimum over-strain or injury to the spring elements. Angular misalignment of the coupling members may in some cases cause slight longitudinal movement between the contact portion of the spring elements and the cooperating contact member, although this is not necessary in all cases, it being possible to secure good results in some instances by preventing such longitudinal movement as by the shape of the parts or tightness of fit between these portions of the device.

Fig. 2 shows another form of spiral spring element of this general type, an intermediate contact portion being formed on the spiral spring by slipping or forcing the brass or other suitable shell 31 over this intermediate part 32 of the spiral spring and then, if desired, securing or holding it more or less in place by one or more transversely extending retaining pins or rivets 30, a cast in filling 28 of type metal or other suitable material preferably of a readily fusible character being used within this shell which may have a roughened inner surface 29 so as to more rigidly connect the convolutions of the spring thereto. As indicated one of the ends 25 of this spiral spring element may be secured to a special recessed head or end member 23 having, if desired, the locking or holding recess 27 formed therein and being continued inward in the form of a grooved core 24 which may fit into the end 25 of the spiral spring element. If desired also a cast in filling 26 of type metal or other suitable material may be used in connection with such a core and end so as to conveniently fill out the end of the built up spring element and more securely unite the parts, it being understood of course that such a special built up end may be formed on both ends of the spring element, if desired. Fig. 3 shows a generally similar construction in which the intermediate enlarged contact portion 38 may as indicated be formed of a single piece of type-metal, Babbitt metal or other material cast around this part 37 of the spiral spring element so as to leave at least a number of the adjacent coils 36 of the spring element free to move under the lateral driving forces exerted thereon in this type of coupling. The spring ends 34, 39 may in this instance be of a single piece of cast material such as type metal or the like cast around the end portions 35 of the spiral spring element and formed, if desired, with holding or locking recesses, such as 40, 41.

Fig. 4 shows another form of coupling in which the spiral spring elements of any suitable size, form and section of spring stock may be arranged in a substantially radial manner, one or more such spring elements being radially or otherwise transversely arranged in one of the coupling members, such as 42, and engaged at one or more intermediate points by contact fingers or members on the opposing coupling member 46. As indicated the coupling member 42 may be secured in any desired way to the shaft 43 and may be formed with a supporting sleeve 45 provided with two or more holes 49 which may in some cases be formed with enlarged or countersunk portions 50. The desired number of spiral springs may be arranged in these holes 49 and have their ends permanently or removably secured therein as by casting into the holes and around the spring ends type metal or other filling members 51 holding the spring ends in place and preferably holding them in somewhat extended or stretched position which in this and the other types of coupling, such as Fig. 1, is usually desirable to prevent sudden buckling action of these spring elements. As shown in Fig. 5 where several such spring elements are arranged radially across a coupling member their intermeshing or more or less overlapping central portions may be joined by a cast on or other junction member 53 which minimizes wear at this point and also holds the spring elements in proper alignment. The cooperating coupling member or element such as 46, which may be secured to the shaft 44 may be formed with contact members of any suitable character to directly or indirectly engage each of the spiral spring connecting elements at one or more intermediate points between their supported ends and in most cases it is desirable to provide sliding contact between these cooperating parts as by forming enlarged contact portions, such as 52, on the spring elements in any suitable way. The cooperating contact members which may engage these contact portions may be in the form of one or more contact fingers 47 engaging each contact portion and preferably closely engaging the opposite sides thereof which allows ample longitudinal and also transverse sliding movement between these parts, while at the same time the transverse driving pressure is readily transmitted so as to ensure the desired resilient driving torque between the coupling members.

Fig. 6 shows a type of spiral spring coupling of this character in which increased resilient action is secured by mounting the spiral springs on an independently movable or floating element or ring which may in some cases be advantageously formed of built-up construction. This floating ring or element may be in the form of a casing comprising one or more sleeves and flanges such as 61, 63, which may be bolted or otherwise united to the end flanges 59, 60 and also in some cases, if desired, with the intermediate flange 62, these flanges preferably having annular recesses, such as 110, 111, into which the sleeves fit. All of these elements may be securely united by a series of bolts, such as 65, extending longitudinally therethrough and simultaneously holding all of these parts rigidly together. One or more annular series of spiral spring elements may be mounted in this floating ring or casing and as indicated in Fig. 6 a convenient removable type of spiral spring element may comprise the spiral spring 66 of any suitable size and material extending substantially throughout the length of this coupling element and having its ends removably secured thereto as by the cast on or other enlarged end members 67, 71 which may be formed on this spring element. By forming holding or locking recesses, such as 72, in these end portions the locking rings 74 may be snapped into these recesses so as to securely hold the spring elements in place preferably after they have been somewhat stretched or extended, although this is not in all cases necessary. In some cases where the intermediate flange 62 is used in this construction a correspondingly spaced enlarged contact portion 69 may be formed on each of the spiral spring elements which preferably has sliding engagement with the holes formed in this intermediate flange so as to allow the desired longitudinal play between these parts in originally adjusting the spring or under operating conditions. It is also desirable to have the free intermediate portions of the spring elements provided with enlarged or other contact portions such as 68, 70 which may be of cast in fusible material, if desired, of such size as to fit the contact slots or holes 109 which may be formed in cooperating coupling members or flanges 57, 58 which may if desired be secured to the shafts 55, 56. Such a coupling naturally gives increased resilient yielding action as compared to a single type coupling of the same size such as shown in Fig. 1 and of course the size and construction of the parts may be so adjusted as to substantially maintain the radial and longitudinal alignment between these cooperating coupling elements.

Fig. 7 shows another form of floating ring coupling in which the floating element may as indicated be in the form of a two-part or separable casing comprising casing sections 82, 83 which may be bolted together by the bolts 86 uniting the casing flanges 84, 85. These casing sections may be formed with internal flanges such as 94, 97 on the casing section 82 and 91, 96 on the casing section 83. If desired, the outer flanges 96, 97 may be removably connected to the corresponding casing sections as by the bolts 112 which may securely and removably connect the co-operating junction flanges 102, 103 on these parts. These flanges may be formed with the desired number of cooperating or aligned holes 112 in which they may be permanently or removably secured the ends of the spring elements 87 which as indicated may in some cases be permanently united to the flanges by the cast in filling members 90 and 91. The outer ends of these spiral spring connecting elements are preferably removably connected to the outer flanges and for this purpose they may be formed with cast on contact portions 88, 93 of Babbitt or other readily fusible metal so that a solid spring end is formed substantially fitting the cooperating holes and preferably having a locking recess such as 81 in its end 73. Thus these spring ends may be held preferably in slightly extended or stretched position by the locking rings 74. These spring connecting elements also preferably have intermediate contact portions, such as 89, 92 of similar fusible material so as to more advantageously engage the flanges 98, 99 on the two coupling members which may be secured to the shafts 78, 79. By this construction the intermediate or contact portions of these spring connecting elements are adapted to resiliently yield in any lateral direction so that the driving torque causes a corresponding transverse displacement of the central portions of these spring elements and also misalignment movements of the parts may cause a corresponding radial displacement of the contact portions of these spring elements with respect to the casing, sufficient clearance being of course provided between these parts to suit any particular case. Thus, if desired, the casing may be yieldingly supported on these spring connecting elements which seems advantageous for some classes of service.

This invention has been described in connection with a number of illustrative embodiments, forms, proportions, parts, shapes, materials, arrangements and method of manufacture and use, to the details of which disclosure the invention is not of course to be limited, since what is claimed as new and what is desired to be secured by Letters Patent is set forth in the appended claims:

1. The flexible coupling comprising a built-up casing having radially projecting apertured flanges, an annular series of spiral spring connecting elements having their ends removably secured in said flanges and provided with enlarged intermediate contact portions and coupling members having contact members within said casing and adapted to engage and substantially enclose said intermediate contact portions to exert transverse driving pressure thereon while longitudinally slidable with respect thereto.

2. The flexible coupling comprising a built-up casing having apertured flanges, a series of spiral spring connecting elements having their ends secured in said flanges and provided with intermediate contact portions and coupling members having contact members within said casing and adapted to engage said intermediate contact portions to exert transverse driving pressure thereon while longitudinally slidable with respect thereto.

3. The flexible coupling comprising a built-up casing having apertured flanges, a series of spiral spring connecting elements having their ends secured in said flanges and coupling members having contact members within said casing and adapted to engage the intermediate portions of said connecting elements to exert transverse driving pressure thereon.

4. The flexible coupling comprising a casing having apertured flanges, an annular series of spiral spring connecting elements having their ends removably secured in said flanges and provided with intermediate contact portions and cooperating coupling members having contact members within said casing and adapted to engage and substantially enclose said intermediate contact portions to exert transverse driving pressure thereon while longitudinally slidable with respect thereto.

5. The flexible coupling comprising a casing, a series of spiral spring connecting elements having their ends secured in said casing and provided with intermediate contact portions and cooperating coupling members having contact members within said casing and adapted to engage said intermediate contact portions to exert transverse driving pressure thereon while longitudinally slidable with respect thereto.

6. The flexible coupling comprising a casing, a series of spiral spring connecting elements having their ends secured in said casing and cooperating coupling members having contact members adapted to engage the intermediate portions of said connecting elements to exert thereon driving pressure in a direction transverse to said connecting elements.

7. In flexible couplings, a coupling element comprising a casing formed with separated radially projecting flanges provided with aligned holes, a substantially annular series of spiral spring connecting elements having enlarged end portions removably secured in said holes to normally stretch said springs, enlarged intermediate contact members on said connecting elements and cooperating coupling elements having sliding engagement with said contact portions to exert transverse driving pressure on said spiral spring connecting elements.

8. In flexible couplings, a coupling element formed with separated holes, a series of spiral spring connecting elements having end portions secured in said holes, enlarged intermediate contact members on said connecting elements and a cooperating coupling element having sliding engagement with said contact portions to exert transverse driving pressure on said spiral spring connecting elements.

9. In flexible couplings, a coupling element formed with separated holes, a series of spiral spring connecting elements having end portions secured in said holes, and a cooperating coupling element having engagement with their intermediate portions to exert transverse driving pressure on said spiral spring connecting elements.

10. The flexible coupling comprising a built-up casing, a series of spiral spring connecting elements having their ends secured in said casing and a cooperating coupling member having contact members adapted to engage said connecting elements to exert thereon driving pressure in a direction transverse to said connecting elements.

11. In flexible couplings, a coupling member formed with holes, a spiral spring connecting element having end portions removably mounted in said holes so that said element is normally in extended stretched condition, an enlarged intermediate contact portion on said element and a cooperating coupling element having a contact member to slidingly engage said contact portion of said connecting element to exert transverse driving pressure thereon in a direction substantially perpendicular to the original length of connecting element.

12. In flexible couplings, a coupling member, a spiral spring connecting element having end portions mounted in said coupling member so that said element is normally in extended condition, an intermediate contact portion on said element and a cooperating coupling element having a contact member to slidingly engage said contact portion of said connecting element to exert transverse driving pressure thereon in a direction substantially perpendicular to the original length of connecting element.

13. In flexible couplings, a coupling member, a spiral spring connecting element having end portions mounted in said coupling member and a cooperating coupling element having a contact member to slidingly engage an intermediate portion of said connecting element to exert transverse driving pressure thereon.

14. In flexible couplings, a coupling element formed with holes, a spiral spring connecting element having end portions mounted in said holes, said connecting element having an intermediate contact portion and a cooperating coupling element having a contact member to slidably engage said contact portion of said connecting element to exert transverse driving pressure thereon.

15. In flexible couplings, a coupling element, a spiral spring connecting element having end portions mounted in said coupling element and a cooperating coupling element having a contact member to engage an intermediate portion of said connecting element to exert thereon driving pressure in a direction transverse to said connecting element.

16. In flexible couplings, a coupling element, a spiral spring connecting element having end portions mounted in said coupling element so that said connecting element is normally in extended condition, said connecting element having an intermediate contact portion and a cooperating coupling element having a contact member to slidably engage said contact portion of said connecting element to exert transverse driving pressure thereon while the ends of said connecting element are held against substantial movement toward each other.

17. In flexible couplings, a coupling element, a spiral spring connecting element having end portions mounted in said coupling element and a cooperating coupling element having a contact member to engage an intermediate portion of said connecting element to exert thereon driving pressure in a direction transverse to said connecting element while the ends of said connecting element are held against substantial movement toward each other.

18. In flexible couplings, a coupling element, a spiral spring connecting element having separated portions removably mounted in said coupling element so that said element is normally in extended condition, said element having an intermediate contact portion and a cooperating coupling element having a contact member to slidingly engage said contact portion of said connecting element to exert transverse driving pressure thereon.

19. In flexible couplings, a coupling element, a spiral spring connecting element having separated portions removably mounted in said coupling element, and a cooperating coupling element having a contact member to slidingly engage the intermediate portion of said connecting element to exert transverse driving pressure thereon.

20. In flexible couplings, a coupling element, a spiral spring connecting element having separated portions connected to said coupling element, and a cooperating coupling element having a contact member to engage the intermediate portion of said connecting element to exert thereon driving pressure in a direction transverse to said connecting element.

21. In flexible couplings, a floating coupling element, a series of spiral spring connecting elements having end portions removably mounted in said coupling element and having an intermediate contact portion resiliently yielding in any transverse direction and cooperating coupling elements having contact members to substantially enclose and slidingly engage said contact portions of said connecting element to transversely displace the same under driving and misalignment pressures.

22. In flexible couplings, a floating coupling element, a series of spiral spring connecting elements having end portions mounted in said coupling element and having an intermediate contact portion resiliently yielding in any transverse direction and cooperating coupling elements having contact members to engage said contact portions of said connecting element to transversely displace the same under driving and misalignment pressures.

23. In flexible couplings, a coupling element, a spiral spring connecting element having separated end portions removably mounted in said coupling element and having an intermediate contact portion resiliently yielding in any transverse direction and a cooperating coupling element having a contact member to substantially enclose and slidingly engage said contact portion of said connecting element to transversely displace the same under driving and misalignment pressures.

24. In flexible couplings, a coupling element, a spiral spring connecting element having separated end portions connected to said coupling element and having an intermediate contact portion resiliently yielding in any transverse direction and a cooperating coupling element having a contact member to engage said contact portion of said connecting element to transversely displace the same under driving and misalignment pressures.

25. The flexible coupling comprising a built-up casing having radially projecting apertured flanges, a series of spiral spring connecting elements having their ends secured in said flanges and provided with intermediate contact portions and a cooperating coupling member having contact members within said casing and adapted to engage said intermediate contact portions to exert transverse driving pressure thereon while longitudinally slidable with respect thereto.

26. The flexible coupling comprising a casing, a series of spiral spring connecting elements having their ends mounted in said casing and a cooperating coupling member adapted to engage said connecting elements at longitudinally separated points to exert thereon driving pressure in a direction transverse to said connecting elements.

27. The flexible coupling comprising cooperating coupling members rotatable about substantially parallel axes and spiral springs extending longitudinally between said members and having opposite ends mounted in one of said members to transmit driving pressure in a direction transverse to the length of said springs.

28. The flexible coupling comprising a coupling member, a series of spiral spring connecting elements having ends mounted in said coupling member and a cooperating coupling member adapted to engage said connecting elements at longitudinally separated points to exert thereon driving pressure in a direction transverse to said connecting elements.

ROBERT A. SMITH.